(No Model.)
A. E. GARDNER.
PENDULUM LEVEL.
No. 318,099. Patented May 19, 1885.
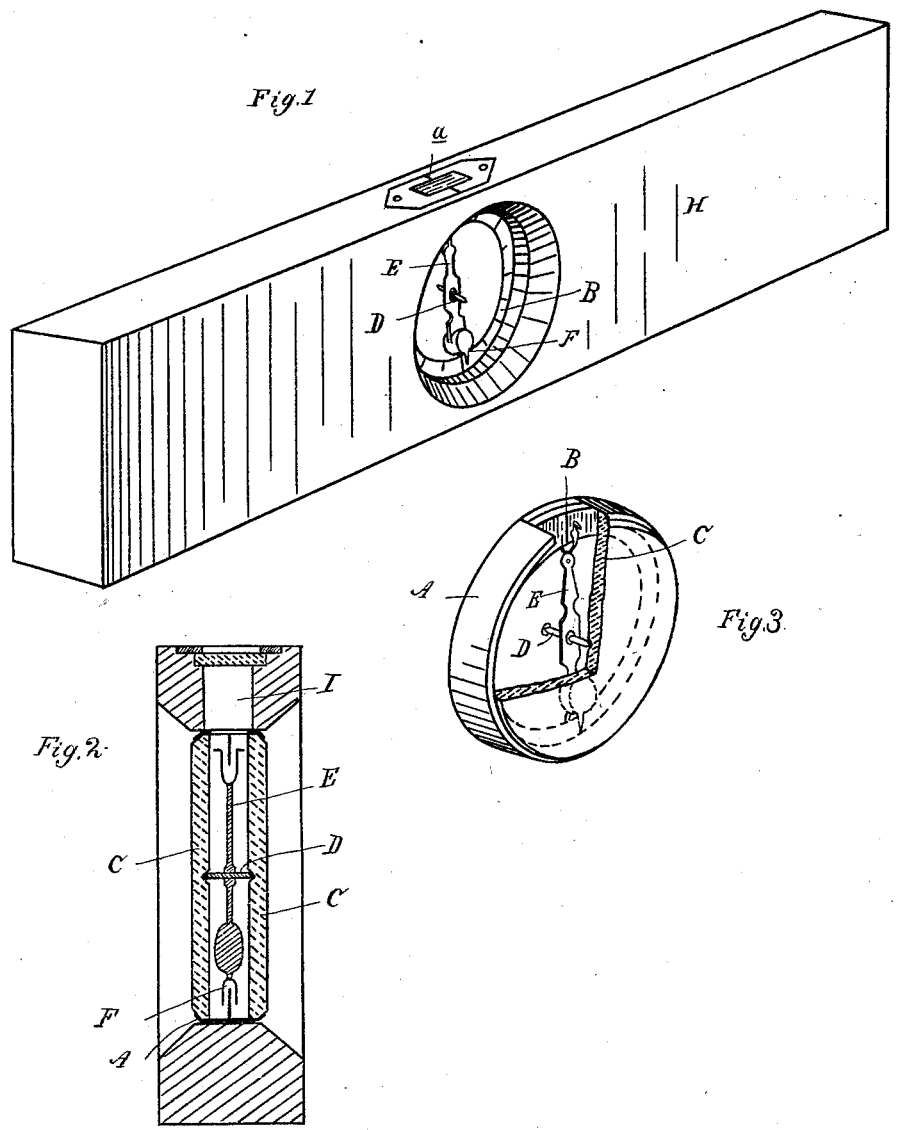
Attest:
John Schuman.
Inventor:
Addison E. Gardner.
by his Atty

UNITED STATES PATENT OFFICE.

ADDISON E. GARDNER, OF MILAN, MICHIGAN, ASSIGNOR OF ONE-HALF TO HENRY B. BESSAC, OF SAME PLACE.

PENDULUM-LEVEL.

SPECIFICATION forming part of Letters Patent No. 318,099, dated May 19, 1885.

Application filed February 5, 1885. (No model.)

*To all whom it may concern:*

Be it known that I, ADDISON E. GARDNER, of Milan, in the county of Monroe and State of Michigan, have invented new and useful Improvements in Plumbs; and I do hereby declare that the following is a full, clear, and exact description thereof, reference being had to the accompanying drawings, which form a part of this specification.

This invention relates to certain new and useful improvements in the construction and operation of a combined level and plumb, whereby the employment of what are ordinarily termed "plumb-bobs," which are very uncertain in their operation, is avoided, and whereby a compact and economical device is provided, ready for use at all times, with accuracy as to the results.

Figure 1 is a perspective of my improved device. Fig. 2 is a vertical central cross-section of the same. Fig. 3 is a detached perspective of the operating parts inclosed within a case or shell.

In the accompanying drawings, which form a part of this specification, A represents a ring, which may be of glass or any suitable metallic substance, and this ring incloses an annular dial, B, centrally located between the two edges of the ring, and this dial is laid off upon both of its faces into a scale, showing the divisions of a circle. Upon each side of the dial, and so as to leave a space between the two, and secured within a ring, are two glass plates or crystals, C, which may be secured in place as watch-crystals are secured, the ring being properly constructed therefor. At a central point the two inner faces of these crystals are countersunk to form bearings for a small shaft, D, upon which there is centrally secured an index-finger, E, one end of which is overweighted and terminates in a bifurcated finger, F, which is designed to straddle the dial and indicate readily to the eye its position with relation to the scale on the dial from either side of the device. The opposite end of this index-finger is also bifurcated, thereby presenting two terminal fingers, one indicating the degree upon the scale upon either side of the dial, and for greater certainty, when the device is used as a level, the ends of this latter-named finger are slightly turned at right angles to the body, as shown in cross-section. This device being thus prepared it is let into and secured to a proper block, H, having a mortise, I, through the top into the central hole cut in such block to receive the operating parts, and this mortise is covered with glass in any of the known ways to exclude dirt, and the block being prepared in the ordinary manner of preparing blocks for levels, a center line, *a*, is drawn across it, so that when it is desired to use the device simply for a level, the operator looking down from the top through this mortise, and finding the upper fingers of the index and the pivotal points of the shaft in line with this central line, finds his level. Of course if the ring inclosing the operating parts is made of metal an opening must be cut in the periphery of such ring coincident with the mortise in the block; but this would not be necessary if the ring itself is made of transparent material.

What I claim as my invention is—

1. In a combined level and plumb, a ring, an index-finger supported upon a shaft which has its bearings in two crystals secured within such ring, in combination with a double-faced dial inclosed between said crystals, and upon which the degrees of a circle are indicated, substantially as described.

2. In a combined level and plumb, a ring within which is secured a two-faced annular dial, the opposite faces of which indicate the degrees of a circle, in combination with two crystals, a shaft, and bifurcated index-finger, the parts being constructed and operating substantially as specified.

3. The combination of the ring A, dial B, crystal C, shaft D, overweighted and bifurcated index-finger, and a level-block having a mortise in its upper face, the parts being constructed, arranged, and operating substantially as and for the purposes set forth.

ADDISON E. GARDNER.

Witnesses:
H. S. SPRAGUE,
E. J. SCULLY.